(12) United States Patent
Strus et al.

(10) Patent No.: US 7,961,145 B1
(45) Date of Patent: Jun. 14, 2011

(54) METHOD AND APPARATUS FOR ESTIMATING RELATIVE POSITION IN A GLOBAL NAVIGATION SATELLITE SYSTEM

(75) Inventors: Joseph M. Strus, Redwood City, CA (US); James W. Sinko, Menlo Park, CA (US)

(73) Assignee: SRI International, Menlo Park, CA (US)

(*) Notice: Subject to any disclaimer, the term of this patent is extended or adjusted under 35 U.S.C. 154(b) by 0 days.

(21) Appl. No.: 12/776,103

(22) Filed: May 7, 2010

(51) Int. Cl.
*G01S 19/51* (2010.01)
(52) U.S. Cl. .................................. 342/357.34
(58) Field of Classification Search .............. 342/357.34
See application file for complete search history.

(56) References Cited

U.S. PATENT DOCUMENTS

| | | | | |
|---|---|---|---|---|
| 5,451,964 A | * | 9/1995 | Babu | 342/357.31 |
| 5,739,785 A | * | 4/1998 | Allison et al. | 342/357.31 |
| 5,867,411 A | * | 2/1999 | Kumar | 708/300 |
| 5,933,110 A | * | 8/1999 | Tang et al. | 342/357.37 |
| 6,127,968 A | * | 10/2000 | Lu | 342/357.31 |
| 6,259,398 B1 | | 7/2001 | Riley | |
| 6,397,147 B1 | * | 5/2002 | Whitehead | 701/213 |
| 6,421,003 B1 | | 7/2002 | Riley | |
| 2008/0272961 A1 | * | 11/2008 | Wirola et al. | 342/357.12 |

OTHER PUBLICATIONS

Basnayake et al., "GPS-Based Relative Positioning Test Platform for Automotive Active Safety Systems", Sep. 2006, ION GNSS 19th International Technical Meeting of the Satellite Division, Fort Worth, TX.*

* cited by examiner

*Primary Examiner* — Thomas H Tarcza
*Assistant Examiner* — Frank McGue

(57) ABSTRACT

The present invention relates to a method and apparatus for estimating relative position in a global navigation satellite system. In one embodiment, a method for estimating a position of a first receiver relative to a second receiver in a global navigation satellite system includes obtaining a first set of measurements from the first receiver, where the first set of measurements estimates a first distance between the first receiver and a satellite in the global navigation satellite system, obtaining a second set of measurements from the second receiver, where the second set of measurements estimates a second distance between the second receiver and a satellite in the global navigation satellite system, performing time domain recursive filtering in accordance with the first set of measurements and the second set of measurements, and estimating the position of a first receiver relative to a second receiver in accordance with the time domain recursive filtering.

24 Claims, 3 Drawing Sheets

METHOD AND APPARATUS FOR ESTIMATING RELATIVE POSITION IN A GLOBAL NAVIGATION SATELLITE SYSTEM

FIELD OF THE INVENTION

The present invention relates generally to satellite navigation systems, and relates more particularly to relative positioning techniques for use by satellite navigation systems.

BACKGROUND OF THE DISCLOSURE

Global navigation satellite systems (GNSS) such as the Global Positioning System (GPS) provide autonomous geospatial positioning with global coverage. GNSS satellites broadcast signals from space that receivers use to estimate their three-dimensional location (latitude, longitude, and altitude).

Currently, two main types of positioning are used by GNSS: absolute positioning and relative positioning. Absolute positioning attempts to find a user's position relative to an absolute (i.e., latitude, longitude) coordinate system. Relative positioning attempts to find the position of a first user (a "rover") relative to a second user (a "reference"). In the latter case, both users may be stationary, both users may be moving, or one user may be stationary and one user may be moving.

Typically, a GNSS receiver makes two measurements in order to perform relative positioning: a code measurement and a carrier phase measurement. These measurements are used to estimate the distance from the user to the satellite transmitter. However, ambiguity in the carrier phase measurement may jeopardize the accuracy of this process. Dual-frequency (L1/L2) GNSS receivers are typically able to compensate for the ambiguity because they make a second set of linearly independent code and carrier phase measurements. However, less expensive single-frequency (L1) GNSS receivers are not able to take advantage of such additional measurements.

SUMMARY OF THE INVENTION

The present invention relates to a method and apparatus for estimating relative position in a global navigation satellite system. In one embodiment, a method for estimating a position of a first receiver relative to a second receiver in a global navigation satellite system includes obtaining a first set of measurements from the first receiver, where the first set of measurements estimates a first distance between the first receiver and a satellite in the global navigation satellite system, obtaining a second set of measurements from the second receiver, where the second set of measurements estimates a second distance between the second receiver and a satellite in the global navigation satellite system, performing time domain recursive filtering in accordance with the first set of measurements and the second set of measurements, and estimating the position of a first receiver relative to a second receiver in accordance with the time domain recursive filtering.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present invention relates to a method and apparatus for estimating relative position in a global navigation satellite system. Embodiments of the invention can be used in single-frequency GNSS receivers to obtain the same relative accuracy that is achieved by more expensive dual-frequency receivers. In one embodiment, this is made possible by using time domain filtering of the single-frequency measurements.

Figure 1:
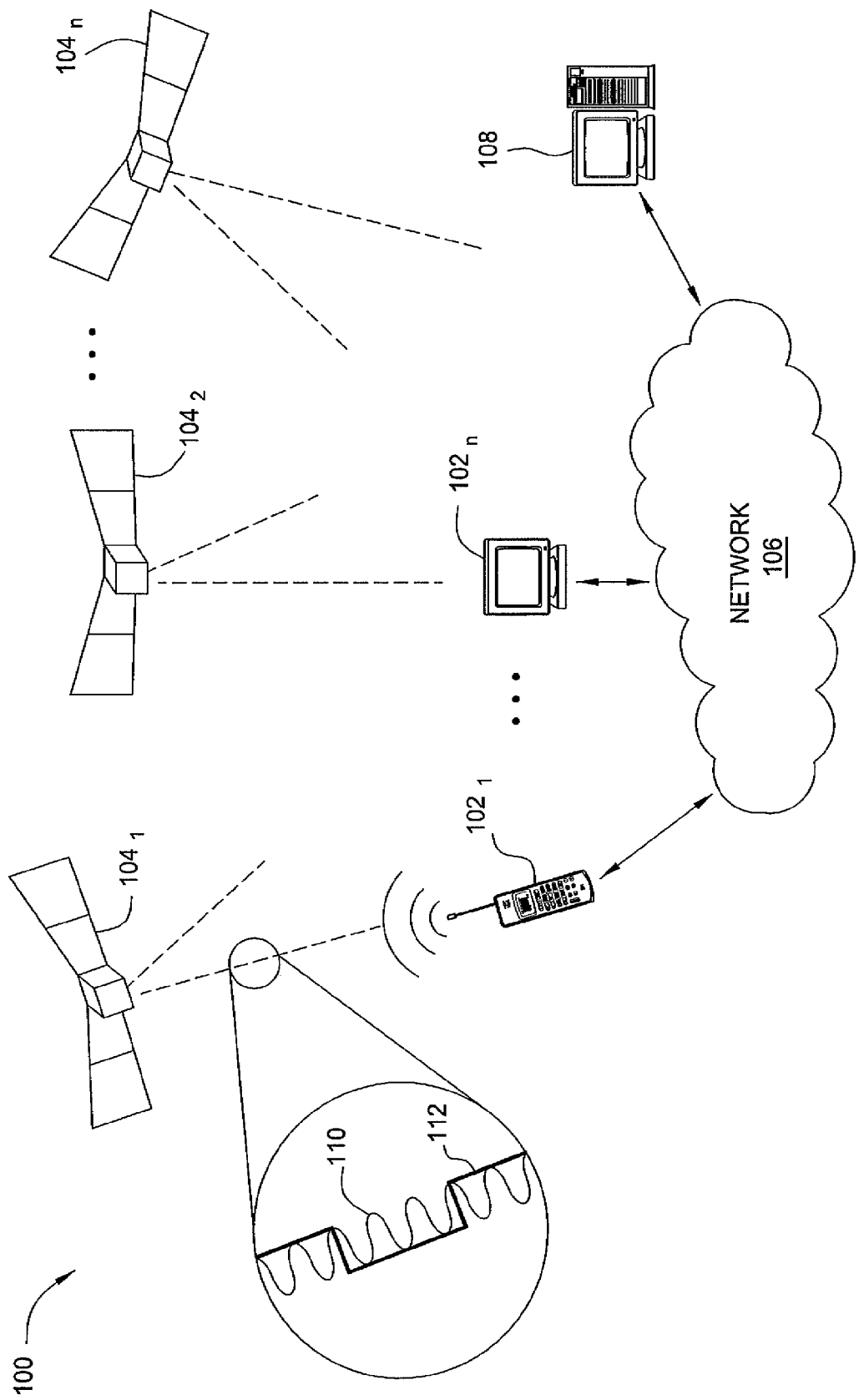
FIG. 1 is a schematic diagram illustrating one embodiment of a system for estimating relative position in a global navigation satellite system, according to the present invention.

FIG. 1 is a schematic diagram illustrating one embodiment of a system 100 for estimating relative position in a global navigation satellite system, according to the present invention.

The system 100 comprises a plurality of GNSS receivers $102_1$-$102_n$ (hereinafter collectively referred to as "receivers 102") and a plurality of GNSS satellites $104_1$-$104_n$ (hereinafter collectively referred to as "satellites 104"). In addition, the system 100 comprises a communication network 106 and at least one computing device 108.

The satellites 104 broadcast signals (illustrated as dashed lines in FIG. 1) from orbital positions that are known as a function of time. In one embodiment, the signals are GPS signals. These signals contain a sinusoidal carrier component 110 modulated by a coarse acquisition (C/A) pseudo-random noise (PRN) code component 112. The code component 112 has a superimposed digital data stream that contains information about the satellite ephemeris, clock bias terms, and other data. The combination of the information in the code component 112 and the digital data allows the receivers 102 to compute the positions of the broadcasting satellites 104.

Specifically, the code component 112 allows unambiguous determination of the length of the transmission path from the satellite 104 to the receiver 102. However, path length based on the code component 112 can only be measured to a relatively coarse resolution. Finer resolution requires measurement of the carrier component 110.

All carrier waves are identical and indistinguishable from each other. As a result, when the phase of the carrier component 110 is determined at the receiver 102, it is ambiguous which specific cycle of the carrier wave is being measured. Thus, the carrier component 110 cannot be used as a distance measurement unless this ambiguity is resolved. The total path length from the satellite antenna to the receiver antenna is the sum of the receiver's measured fraction of a cycle and an unknown number of integer cycles.

The receivers 102 receive the broadcast signals from the satellites 104. In particular, each receiver 102 receives the signals over an array of antennas (not shown), where each pair of antennas defines a baseline there between. In one embodiment, each receiver 102 receives signals from at least three of the satellites 104. Specifically, the receivers 102 perform code range and carrier phase range measurements from the timing and satellite orbital position information in the code component 112 and the digital data, which are used for determining the baseline vectors of the receiver antennas.

The computing device 108 comprises, for example, a desktop computer, a laptop computer, a tablet computer, a cellular telephone, a personal digital assistant, a gaming console, a GNSS receiver, or any other device that is capable of performing computations. The computing device 108 can compute single or double differences of the code and carrier phase range measurements between antennas (i.e., as measured by the receivers 102). Single difference measurements involve signals received by two receiver antennas from one satellite 104; double difference measurements involve signals received by two receiver antennas from two satellites 104. Double difference measurements are used to eliminate the effects of receiver clock, satellite clock, and ephemeris inaccuracies.

The receivers 102 and the computing device 108 are communicatively coupled to the network 106. The network 106 therefore allows the receivers 102 and the computing device 108 to share data. In one embodiment, the receivers 102 send their code measurements and carrier phase measurements to the computing device 108 over the network 106. The computing device 108 uses these measurements to estimate the relative position of a rover receiver relative to a reference receiver. The computing device 108 may send the estimated relative position to the rover receiver and/or the reference receiver over the network 106.

Figure 2:
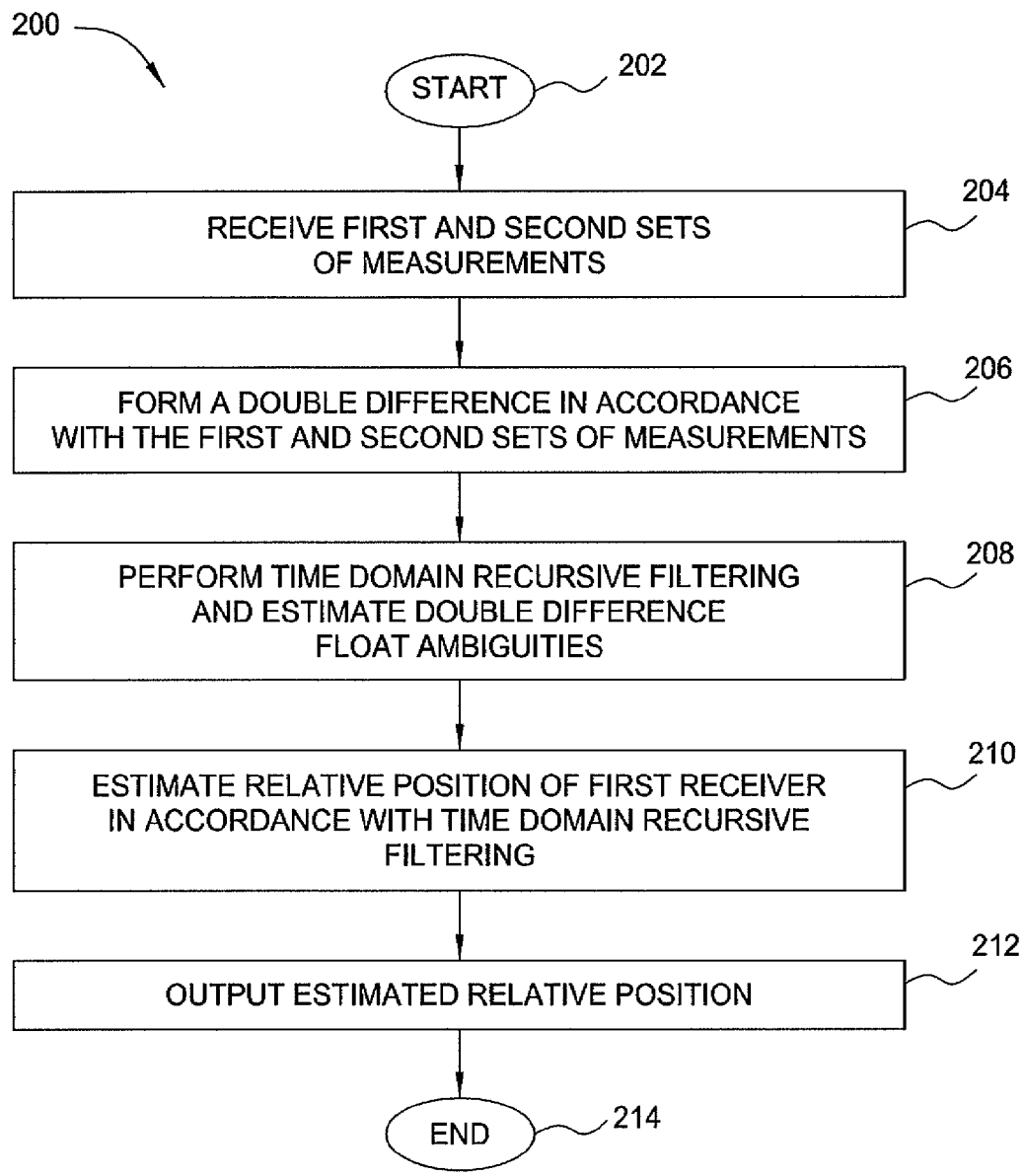
FIG. 2 is a flow diagram illustrating one embodiment of a method for estimating relative position in a global navigation satellite system, according to the present invention.

FIG. 2 is a flow diagram illustrating one embodiment of a method 200 for estimating relative position in a global navigation satellite system, according to the present invention. The method 200 may be implemented, for example, by the computing device 108 illustrated in FIG. 1. Alternatively, the method 200 may be implemented by one or more of the receivers 102. As such, reference is made in the discussion of FIG. 1 to various elements of the system 100. It will be appreciated, however, that application of the method 200 is not limited to systems configured in the manner illustrated in FIG. 1.

The method 200 is initialized in step 202 and proceeds to step 204, where the computing device 108 receives a first set of measurements from a first receiver $102_1$ and a second set of measurements from a second receiver $102_n$. In the case where the method 200 is executing at one of the receivers 102, the receiver 102 at which the method 200 is executing may directly make one of the first or second set of measurements. In one embodiment, each set of measurements includes a code measurement and a carrier phase measurement as measured by the sending receiver 102. In one embodiment, the first receiver $102_1$ is the rover, while the second receiver $102_n$ is the reference.

In step 206, the computing device 108 forms double differences in accordance with the measurements received in step 204. The double differences may be formed or computed in accordance with any known technique for computing double differences.

In step 208, the computing device 108 performs time domain recursive filtering and estimates the double difference float ambiguities. In one embodiment, the filtering is performed using a Kalman filter. A Kalman filter estimates the internal state of a linear dynamic system from a series of noisy measurements. In this embodiment, the states in the Kalman filter are: relative velocity (i.e., the velocity of the first receiver relative to the second receiver), relative position (i.e., the position of the first receiver relative to the second receiver), and the double difference float ambiguities. In one embodiment, the double difference float ambiguities are single frequency double difference float ambiguities. However, the same approach is effective for use with double-frequency receivers 102.

The Kalman filter exploits a trusted model of the dynamics of the first receiver $102_1$, which describes the kind of movement possible by the first receiver $102_1$, to remove the effects of the noise and get a good estimate of the relative position of the first receiver $102_1$. The noise may comprise measurement noise or process noise. In one embodiment, the measurement noise is based on satellite elevation, receiver noise estimation, and receiver speed. In this case, the satellites 104 are weighted more favorably when the first receiver $102_1$ is in motion. This is advantageous because the signal multipath (i.e., the propagation of the signal to the first receiver $102_1$ along two or more paths) is typically reduced as a function of receiver dynamics (e.g., when a vehicle in which the first receiver $102_1$ is mounted is moving). In a GNNS, the multipath effect can cause a stationary receiver's output to appear as if it is randomly jumping or creeping. When the receiver is moving, the jumping or creeping is hidden, but still degrades the accuracy.

Once individual noise estimations are made, a measurement noise variance matrix formulation is produced. In one embodiment, the measurement noise variance matrix is the standard noise measurement matrix that is common to Kalman filters. The measurement noise variance matrix is used to add uncertainty to the position estimate between measurement updates.

In addition, the double difference float ambiguities estimated in step 208 are known to be constant over time. Thus, the Kalman filter averages the double difference ambiguities over time.

If lock on a satellite 104 is lost from the first receiver $102_1$ or the second receiver $102_n$, then the double difference float ambiguities are re-initialized. Re-initializing the Kalman filter in this way forces the smoothing time of the code to be the same for each individual satellite 104 and each receiver 102. This effectively minimizes the effects of ionospheric divergence common in some types of time domain filtering. Because relative position is one of the Kalman filter states, when a satellite 104 is lost and reacquired in this way, the double difference float ambiguities can be accurately restored.

In step 210, the computing device 108 estimates the relative position of the first receiver $102_1$ as a function of time, in accordance with the time domain recursive filtering (e.g., as embodied in the Kalman filter).

In step 212, the computing device 108 outputs the estimated relative position to the first receiver $102_1$. In addition, the computing device 108 may output the estimated relative position to the second receiver $102_n$ and/or to another receiver 102 or computing device. The method 200 then terminates in step 214.

After the solution has converged to a specified uncertainty, an ambiguity resolution algorithm can be run using the double difference float ambiguities and the covariance produced by the filter to attempt to fix the float ambiguities to their integer values.

As discussed above, the double difference ambiguities are known to be constant over time. Thus, the Kalman filter optimally estimates the double difference ambiguities over time. This multi-epoch approach allows one to accurately estimate the relative position of a single-frequency receiver by using time domain filtering of the single-frequency measurements. Over time, the accuracy of the estimate will improve further.

Although the method 200 is described within the context of a single rover and a single reference, the system 100 and method 200 can be generalized such that each receiver 102 broadcasts its code and carrier measurements over a central network 106. Additional receivers 102 that wish to navigate relative to particular receiver 102 then subscribe to the data broadcast from the particular receiver 102 and calculate a relative solution. In this way, a mesh is established whereby relative positioning can be performed among any pair of receivers 102 in the mesh. An alternative network solution uses a central processor (such as the computing device 108) to operate on the code and carrier measurements.

Figure 3:
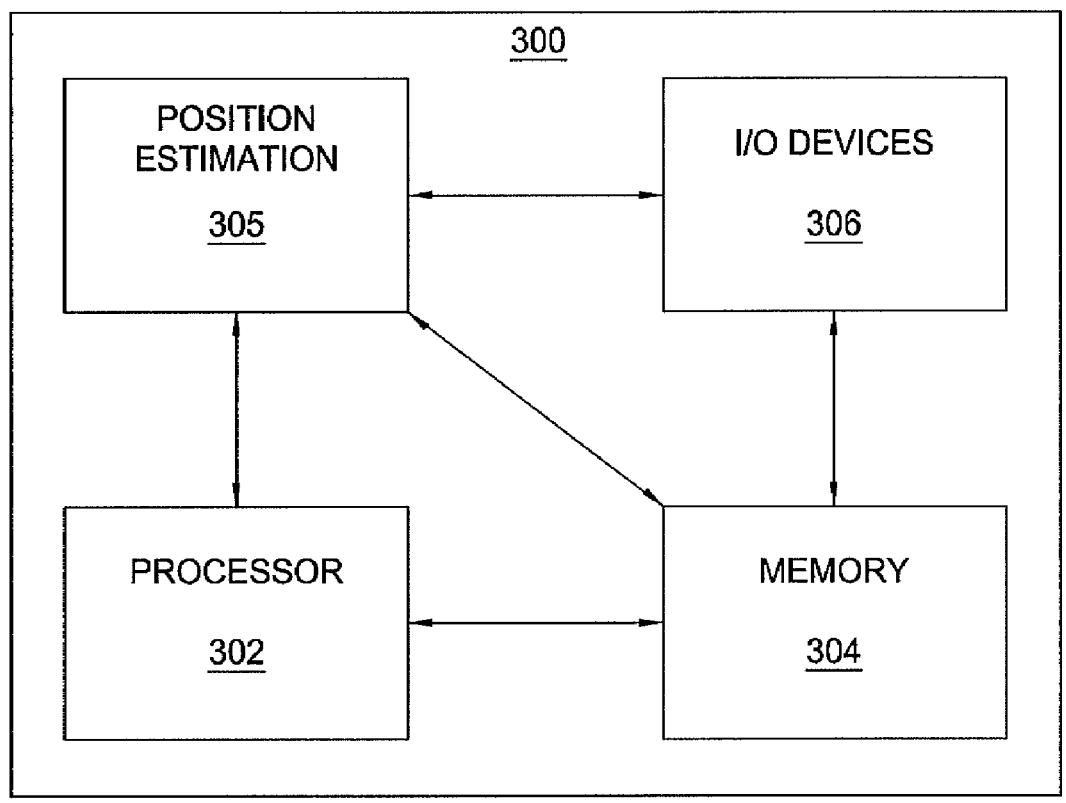
FIG. 3 is a high level block diagram of the present invention implemented using a general purpose computing device.

FIG. 3 is a high level block diagram of the present invention implemented using a general purpose computing device 300. It should be understood that embodiments of the invention can be implemented as a physical device or subsystem that is coupled to a processor through a communication channel. Therefore, in one embodiment, a general purpose computing device 300 comprises a processor 302, a memory 304, a position estimation module 305, and various input/output (I/O) devices 306 such as a display, a keyboard, a mouse, a modem, a microphone, speakers, a touch screen, and the like. In one embodiment, at least one I/O device is a storage device (e.g., a disk drive, an optical disk drive, a floppy disk drive).

Alternatively, embodiments of the present invention (e.g., position estimation module 305) can be represented by one or more software applications (or even a combination of software and hardware, e.g., using Application Specific Integrated Circuits (ASIC)), where the software is loaded from a storage medium (e.g., I/O devices 306) and operated by the processor 302 in the memory 304 of the general purpose computing device 300. Thus, in one embodiment, the position estimation module 305 for estimating the relative position of a GNSS receiver described herein with reference to the preceding Figures can be stored on a non-transitory computer readable medium (e.g., RAM, magnetic or optical drive or diskette, and the like).

It should be noted that although not explicitly specified, one or more steps of the methods described herein may include a storing, displaying and/or outputting step as required for a particular application. In other words, any data, records, fields, and/or intermediate results discussed in the methods can be stored, displayed, and/or outputted to another device as required for a particular application. Furthermore, steps or blocks in the accompanying Figures that recite a determining operation or involve a decision, do not necessarily require that both branches of the determining operation be practiced. In other words, one of the branches of the determining operation can be deemed as an optional step.

Although various embodiments which incorporate the teachings of the present invention have been shown and described in detail herein, those skilled in the art can readily devise many other varied embodiments that still incorporate these teachings.

What is claimed is:

1. A method for estimating a position of a first receiver relative to a second receiver in a global navigation satellite system, the method comprising:
    obtaining a first set of measurements from the first receiver, the first set of measurements estimating a first set of distances between the first receiver and a plurality of satellites in the global navigation satellite system;
    obtaining a second set of measurements from the second receiver, the second set of measurements estimating a second set of distances between the second receiver and the plurality of satellites in the global navigation satellite system;
    performing a time domain recursive filtering in accordance with the first set of measurements and the second set of measurements, wherein the time domain recursive filtering produces a set of double difference float ambiguities, each double difference float ambiguity in the set of double difference float ambiguities being averaged over a period of time; and
    estimating the position of the first receiver relative to the second receiver in accordance with the time domain recursive filtering,
    wherein at least one of: the obtaining the first set of measurements, the obtaining the second set of measurements, the performing, or the estimating is performed by a processor.

2. The method of claim 1, wherein the time domain recursive filtering is performed using a Kalman filter.

3. The method of claim 2, wherein the Kalman filter comprises a plurality of states, the plurality of states comprising: a velocity of the first receiver relative to the second receiver, the position of the first receiver relative to the second receiver, and the set of double difference float ambiguities computed from the first set of measurements and the second set of measurements.

4. The method of claim 3, wherein the set of double difference float ambiguities is optimally estimated over a period of time.

5. The method of claim 1, wherein at least one of the first set of measurements and the second set of measurements comprises single-frequency measurements.

6. The method of claim 1, wherein the method is performed by a remote computing device that is separate from, but communicatively coupled to, the first receiver and the second receiver.

7. The method of claim 6, further comprising:
    outputting the position of the first receiver relative to the second receiver to at least one of the first receiver and the second receiver.

8. The method of claim 1, wherein the method is performed by the first receiver or the second receiver.

9. The method of claim 1, wherein the performing the time domain recursive filtering comprises:
    performing a code averaging for a code component of the first set of measurements and the second set of measurements over a common period of time at the first receiver and at the second receiver.

10. The method of claim 1, further comprising:
    removing one or more effects of noise in at least one of the first set of measurements and the second set of measurements, wherein the removing involves performing a computation that weighs multipath signals from the plurality of satellites based on a speed of at least one of the first receiver or the second receiver.

11. A non-transitory computer readable medium containing an executable program for estimating a position of a first receiver relative to a second receiver in a global navigation satellite system, where the program performs steps comprising:
    obtaining a first set of measurements from the first receiver, the first set of measurements estimating a first set of distances between the first receiver and a plurality of satellites in the global navigation satellite system;
    obtaining a second set of measurements from the second receiver, the second set of measurements estimating a second set of distances between the second receiver and the plurality of satellites in the global navigation satellite system;
    performing a time domain recursive filtering in accordance with the first set of measurements and the second set of measurements, wherein the time domain recursive filtering produces a set of double difference float ambiguities, each double difference float ambiguity in the set of double difference float ambiguities being averaged over a period of time and estimating the position of the first receiver relative to the second receiver in accordance with the time domain recursive filtering.

12. The non-transitory computer readable medium of claim 11, wherein the time domain recursive filtering is performed using a Kalman filter.

13. The non-transitory computer readable medium of claim 12, wherein the Kalman filter comprises a plurality of states, the plurality of states comprising: a velocity of the first receiver relative to the second receiver, the position of the first receiver relative to the second receiver, and the set of double difference float ambiguities computed from the first set of measurements and the second set of measurements.

14. The non-transitory computer readable medium of claim 13, wherein the set of double difference float ambiguities is optimally estimated over a period of time.

15. The non-transitory computer readable medium of claim 11, wherein at least one of the first set of measurements and the second set of measurements comprises single-frequency measurements.

16. The non-transitory computer readable medium of claim 11, wherein the method is performed by a remote computing device that is separate from, but communicatively coupled to, the first receiver and the second receiver.

17. The non-transitory computer readable medium of claim 16, further comprising:
outputting the position of the first receiver relative to the second receiver to at least one of the first receiver and the second receiver.

18. The non-transitory computer readable medium of claim 11, wherein the method is performed by the first receiver or the second receiver.

19. The non-transitory computer readable medium of claim 11, wherein the performing the time domain recursive filtering comprises:

performing a code averaging for a code component of the first set of measurements and the second set of measurements over a common period of time at the first receiver and at the second receiver.

20. The non-transitory computer readable medium of claim 11, further comprising:
removing one or more effects of noise in at least one of the first set of measurements and the second set of measurements, wherein the removing involves performing a computation that weighs multipath signals from the plurality of satellites based on a speed of at least one of the first receiver or the second receiver.

21. A global navigation satellite system, the system comprising:
a plurality of satellites for broadcasting global navigation satellite system signals;
a plurality of receivers for receiving and processing the global navigation satellite system signals; and
at least one Kalman filter for estimating relative positions of the plurality of receivers and for averaging double difference float ambiguities computed from the global navigation satellite system signals over a period of time.

22. The global navigation satellite system of claim 21, wherein the Kalman filter is incorporated into a computing device that is separate from, but communicatively coupled to, at least some of the plurality of receivers.

23. The global navigation satellite system of claim 21, wherein the Kalman filter is incorporated into at least one of the plurality of receivers.

24. The global navigation satellite system of claim 21, wherein at least some of the plurality of receivers are single-frequency receivers.

* * * * *